United States Patent [19]

Rise et al.

[11] 4,407,404
[45] Oct. 4, 1983

[54] WORK TRANSFER DEVICE

[75] Inventors: William E. Rise, Utica; Gregory J. Masserang, Farmington, both of Mich.

[73] Assignee: Android Corporation, Auburn Hts., Mich.

[21] Appl. No.: 280,385

[22] Filed: Jul. 6, 1981

[51] Int. Cl.³ .............................................. B65G 25/00
[52] U.S. Cl. .................................................... 198/774
[58] Field of Search ......................... 198/774, 621, 740

[56] References Cited

U.S. PATENT DOCUMENTS

| | | | |
|---|---|---|---|
| 3,135,395 | 6/1964 | Wallis | 198/621 |
| 3,430,782 | 3/1969 | Henkel | 198/621 |
| 4,311,429 | 1/1982 | Wallis | 198/621 |

Primary Examiner—Joseph E. Valenza
Assistant Examiner—Jonathan D. Holmes
Attorney, Agent, or Firm—Stephenson and Boller

[57] ABSTRACT

A work transfer device executes a generally rectilinear path of movement for progressively transferring articles between successive stations. Transverse vertical motion is imparted via a track which is bodily transversely displaced while maintained parallel with the longitudinal travel of the carriage. A roller rides in the track with longitudinal motion of the carriage. The track is displaced by a double bellcrank mechanism to shift the roller vertically and in turn impart vertical transverse motion to the device.

23 Claims, 12 Drawing Figures

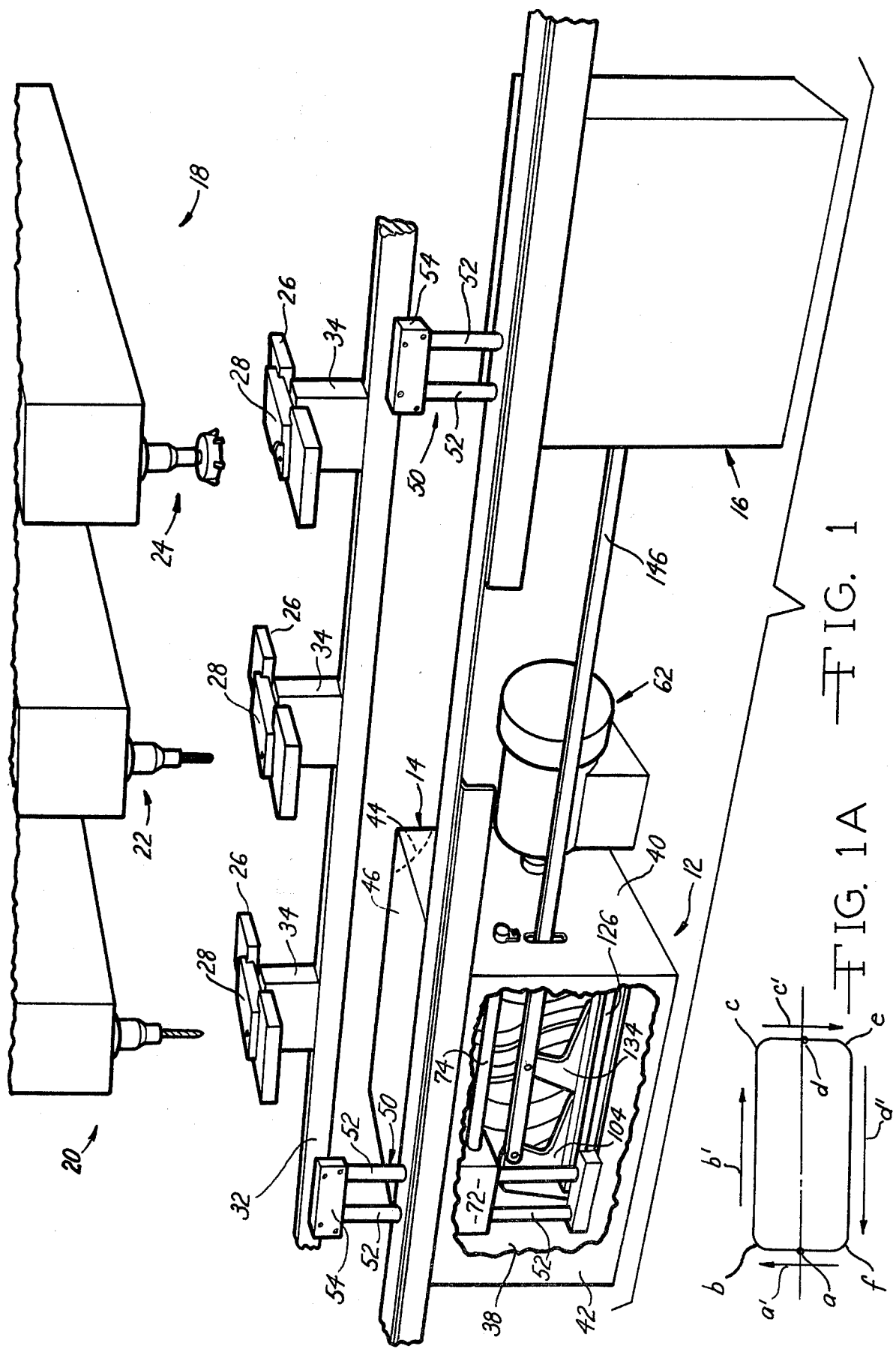

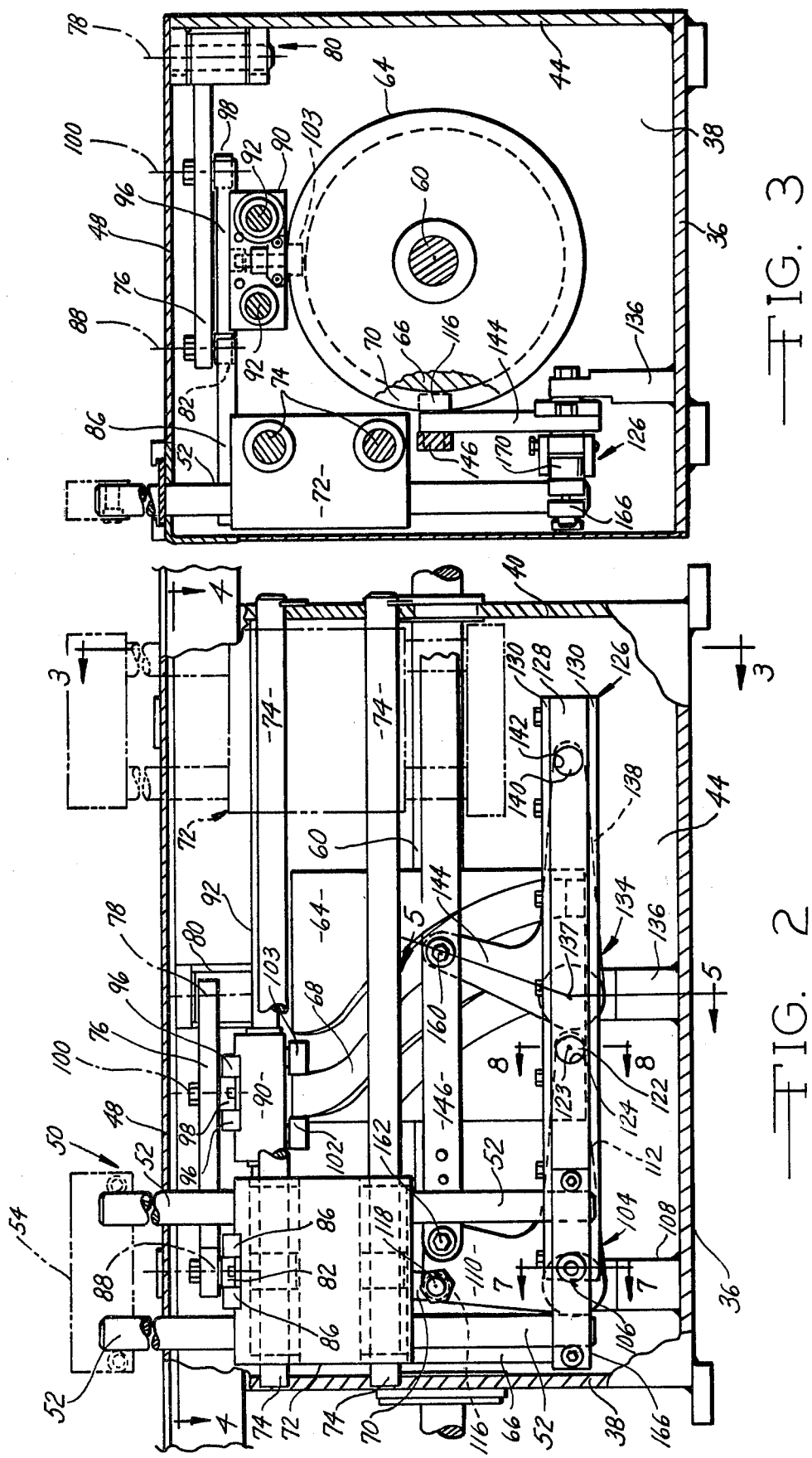

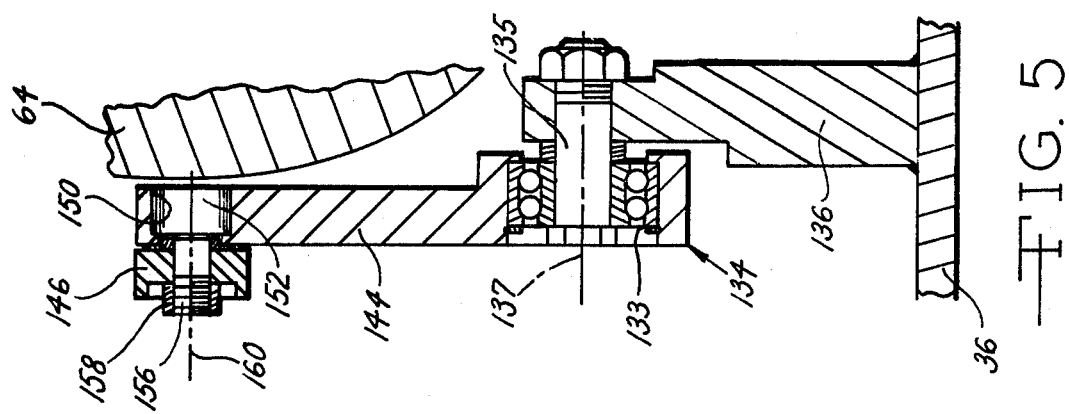
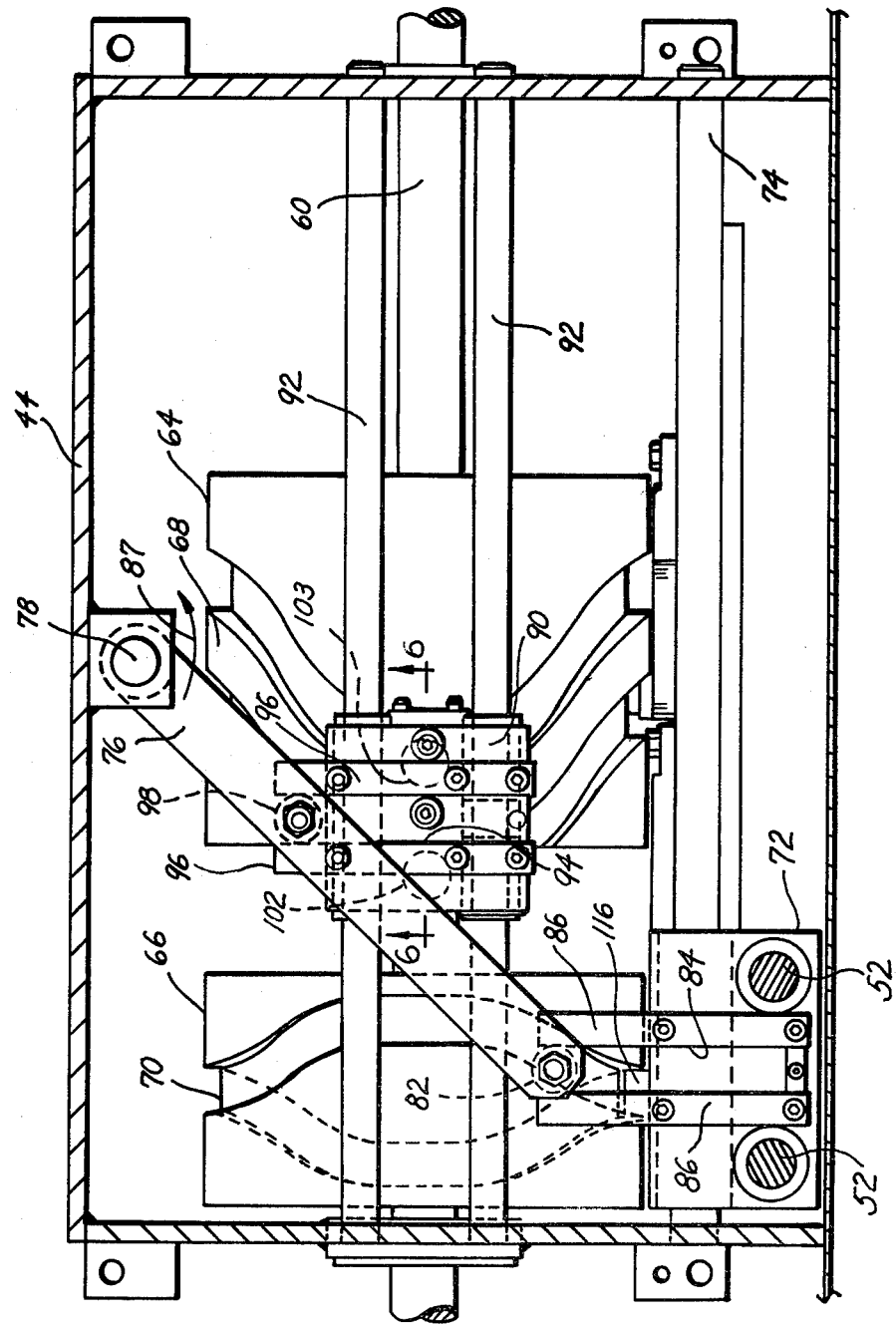
FIG. 5
FIG. 4

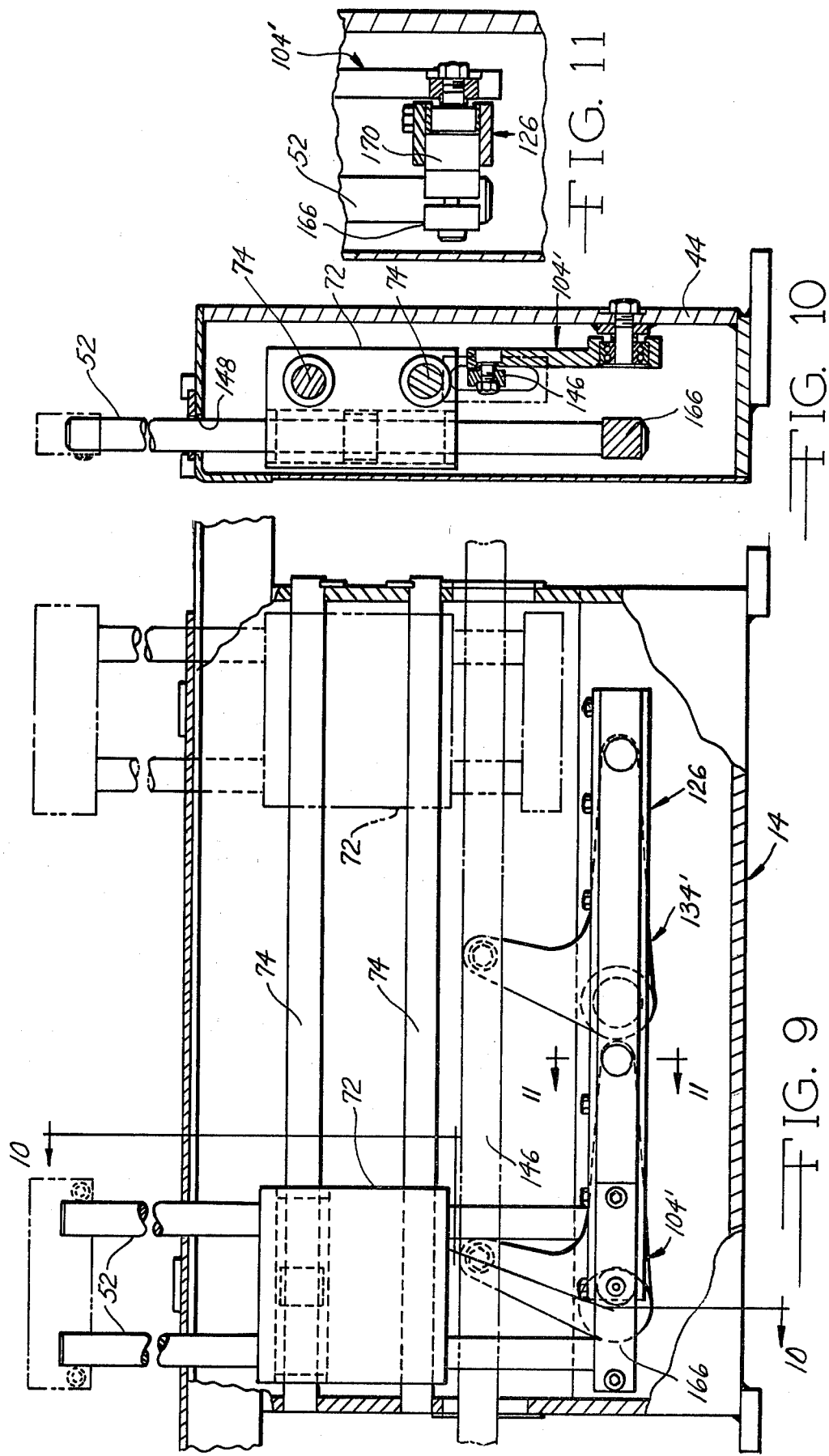

WORK TRANSFER DEVICE

BACKGROUND AND SUMMARY OF THE INVENTION

This invention relates generally to work transfer devices and is more specifically concerned with a work transfer device of the type which repeatedly executes an operating cycle of motion in a closed, generally rectilinear path to progressively advance workpieces from station to station.

In automation machining it is a conventional practice to position a plurality of machine tools in a series path and to progressively move workpieces along this path for machining operations. One type of work transfer device for progressively advancing workpieces repeatedly executes an operating cycle consisting of motion in a closed, generally rectilinear path. This type of device generates motion along two perpendicularly related axes, one longitudinal, the other transverse. A typical cyclical sequence for progressively advancing workpieces involves a longitudinal transfer stroke for advancing each workpiece longitudinally from one machining station to the next, a transverse retraction stroke for releasing the workpieces at their new stations, a longitudinal return stroke to prepare for the next transfer, and a transverse extension stroke to once again engage the workpieces for the next longitudinal transfer stroke. This rectilinear cycle is repeatedly executed whereby workpieces are progressively advanced through successive machining operations.

Typically, the longitudinal motion axis is horizontal while the transverse motion axis is either horizontal or vertical. In the case of a vertical transverse motion axis the work transfer device may be of a type commonly referred to as a walking beam transfer device. The walking beam comprises a horizontal beam which spans the length of the series path and on which workpiece engaging members are mounted at uniformly spaced longitudinal distances equal to the length of the longitudinal stroke. The stations are similarly uniformly longitudinally spaced. The walking beam repeatedly executes the above described closed loop operating cycle to progressively advance the workpieces from station to station.

In the prior work transfer devices of this type, motion for each axis is derived from a rotary cam, such as a barrel cam. The cams are driven from a prime mover such as an electric or hydraulic drive. Followers are engaged with the cams and operably coupled with the walking beam via appropriate mechanisms to impart the desired rectilinear motion to the workpiece engaging members. Typically, the cams are rotated in unison from a common prime mover and the phasing between cams is such as to impart the desired rectilinear motion to the workpiece engaging members.

In the case of a lift and carry type transfer, which would be executed by a walking beam type device, one cam controls the horizontal longitudinal motion while the other cam controls the vertical transverse motion. Where both cams are barrel cams mounted on a common shaft the shaft may be arranged parallel to one of the two motion axes, say for example the horizontal longitudinal axis. The throw, or profile, of the horizontal cam is therefore also longitudinal, and the mechanism for coupling the horizontal cam with the walking beam to impart horizontal longitudinal motion to the walking beam is not especially complex. Such a mechanism may simply be a longitudinally shiftable carriage having a cam follower following the horizontal cam profile. Such a mechanism will, for a given cam profile, possess a fixed longitudinal stroke corresponding exactly to the throw of the cam. Alternatively, other mechanisms may be used to provide adjustable stroke length.

However, the throw of the vertical cam is also horizontal. Consequently a more complex mechanism is required in order to couple the vertical cam with the walking beam to effect vertical stroking. One prior mechanism comprises a bellcrank to transform the horizontal throw or profile of the vertical cam into vertical motion of the walking beam. For this purpose the bell crank is mounted on the work transfer device for rocking motion about a pivot axis. One arm of the bellcrank is coupled to the vertical cam while the other arm is arranged at an angle to the first arm. The bellcrank converts the generally horizontal rocking motion of the first arm into generally vertical rocking motion of the second arm. Because the walking beam must move vertically at both the beginning and at the end of the longitudinal stroke it is necessary for the coupling between the second crank arm and the walking beam to accommodate the full longitudinal stroke imparted to the walking beam by the horizontal cam.

One previous construction for accomplishing this involves a horizontal track which is bodily shifted longitudinally with longitudinal stroking of the walking beam. The track is also bodily shiftable vertically, and the walking beam is vertically supported on the track. The second crank arm of the bellcrank comprises a roller which rides in the track. The track is long enough that the roller remains in the track throughout the full longitudinal stroke. When the walking beam is at either end of its longitudinal stroke, the vertical cam is effective to rock the bellcrank which in turn via the engagement of the roller with the track is effective to impart the corresponding vertical transverse motion to the track, and hence also to the walking beam.

This prior construction possesses a number of disadvantages. One disadvantage is that the track shifts longitudinally with the longitudinal stroke and hence, the overall longitudinal dimension for the device must accommodate both the longitudinal stroke plus the length of the track. This can impose constraints on the layout of the automated line resulting in undesirable inefficiencies.

Another disadvantage is that the weight carrying capacity is limited due to the requirement that the bellcrank be capable of supporting the weight at both ends of the longitudinal stroke. Because the moment acting about the pivot axis of the bellcrank due to the combined weights of the walking beam and workpieces is greater when the walking beam is at one end of its longitudinal stroke than at the other end, the weight carrying capacity is established when the walking beam is at that one end. Obviously, this is less than the weight carrying capacity that would be obtained if the moment with the beam at one end were the same as the moment with the beam at the other end.

Prior walking beam mechanisms present a problem where a relatively long transfer stroke is involved, say 16 inches or more, or where the overall length of the transfer line is relatively long. There may arise a need for a plurality of cam operated transfer devices, and these can involve higher cost, larger space requirements, and more complicated adjustment. It becomes difficult to synchronize the devices so as to produce the desired simultaneous transfer of workpieces from station to station.

The present invention provides a new and improved work transfer device which overcomes the foregoing disadvantages of prior work transfer devices. With the present invention the overall longitudinal dimension of such a work transfer device can more closely correspond to the length of the longitudinal transfer stroke. This yields greater efficiencies in the layout and operation of an automated line using the invention in association therewith. Furthermore, the invention avoids the weight carrying limitations inherent in prior work transfer devices of the type described above. The invention is particularly well suited for walking beam type transfer devices although its principles are not limited to that specific type. The invention provides a more efficient arrangement of component parts within the work transfer device, and it also provides the capability for slaving additional work transfer devices to a master device without the problem of having to synchronize cams of one device to those of other devices. The master device contains the two cams for imparting the longitudinal and the transverse motions. The slave units do not contain any such cams and hence may be substantially compact. Yet the slave units incorporate principles of the invention constituting improvements over prior work transfer devices.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time for carrying out the invention.

BRIEF DESCRIPTION OF THE DRAWINGS

FIG. 1 is a perspective view, having portions removed, of a work transfer device embodying principles of the present invention and shown in use in an automatic machining installation for advancing workpieces between successive machining stations.

FIG. 1A is a diagram illustrating the motion executed by the work transfer device of FIG. 1.

FIG. 2 is a front elevational view, having a portion broken away, of one portion of the work transfer device of FIG. 1.

FIG. 3 is a vertical sectional view taken in direction of arrows 3—3 in FIG. 2.

FIG. 4 is an enlarged horizontal sectional view taken in the direction of arrows 4—4 in FIG. 2.

FIG. 5 is an enlarged fragmentary sectional view taken in the direction of arrows 5—5 in FIG. 2.

FIG. 9 is a front elevational view, having portions broken away, of another portion of the work transfer device of FIG. 1.

FIG. 10 is a generally vertical sectional view taken in the direction of arrows 10—10 in FIG. 9.

FIG. 11 is an enlarged fragmentary vertical sectional view taken in the direction of arrows 11—11 in FIG. 9.

DESCRIPTION OF THE PREFERRED EMBODIMENT

Figure 6:
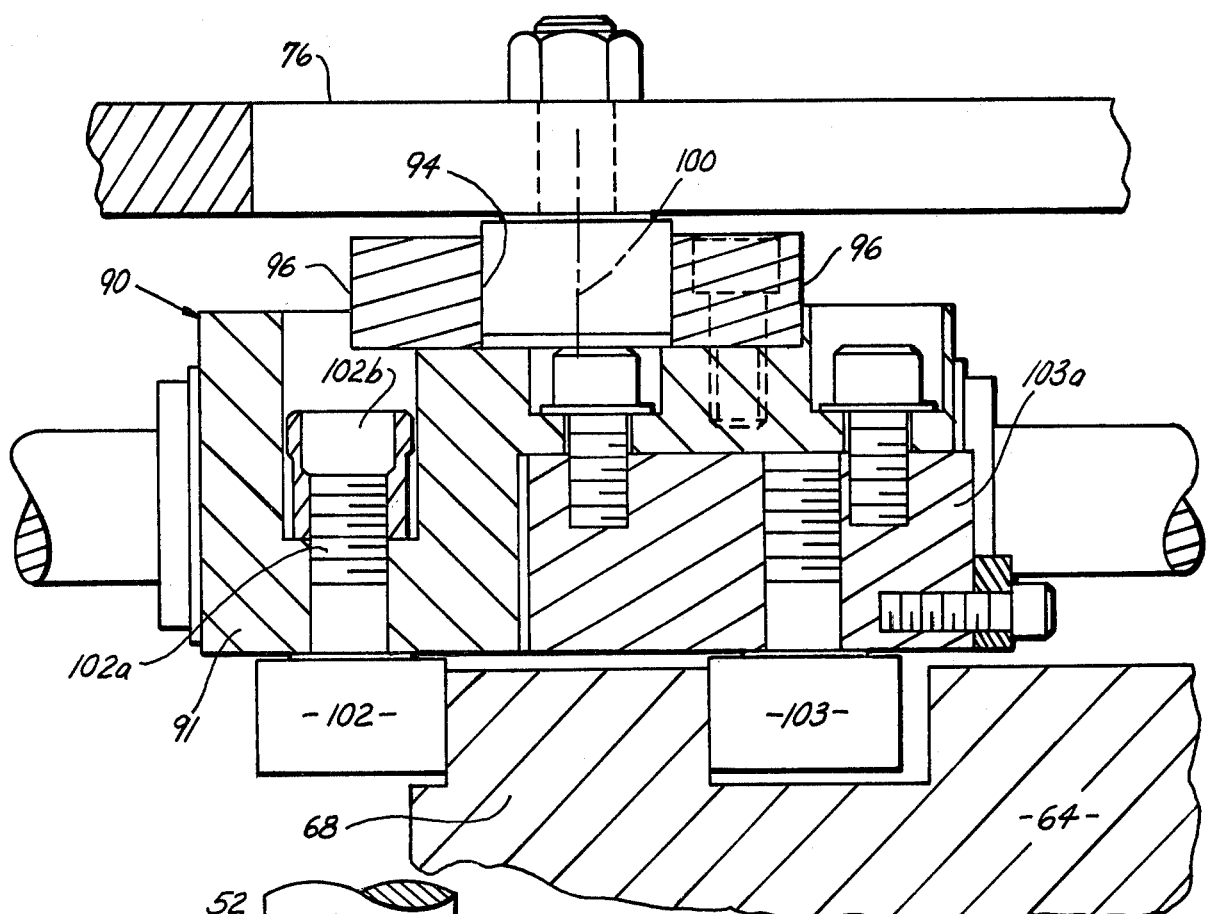
FIG. 6 is an enlarged fragmentary vertical sectional view taken in the direction of arrows 6—6 in FIG. 4.
Figure 7:
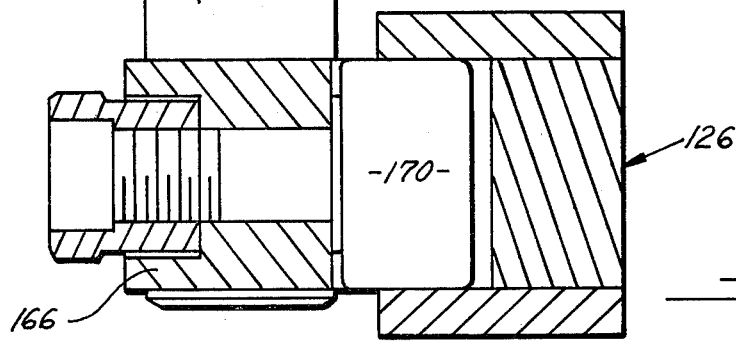
FIG. 7 is an enlarged fragmentary vertical sectional view taken in the direction of arrows 7—7 in FIG. 2.

In FIG. 1 a work transfer device 12 embodying principles of the present invention is shown to comprise a master device 14 and a slave device 16. The work transfer device is shown in association with an automated machining line 18 having three machining stations 20, 22 and 24. Each machining station includes a work station 26 at which workpieces 28 are machined. Detail of each work station 26 is omitted from the drawing in the interest of clarity. Briefly, each such work station comprises a locating jig or fixture for accurately locating a workpiece in relation to the corresponding machining device. If necessary, various types of hold down and locating devices, such as pneumatic, hydraulic, or electrically actuated clamps and alignment pins, may be used to secure and accurately position the workpieces in the fixtures for machining operations. The work stations are uniformly equally spaced in the horizontal longitudinal direction.

In operation of the machining line 18 each machining station 20, 22, 24 simultaneously performs an operation on the workpiece 28 which is located at the corresponding work station 26. Upon completion of the respective machining operations the workpieces are simultaneously transferred with each workpiece being advanced one work station. The machining operations are once again conducted and in this way workpieces are successively machined by the stations 20, 22, 24 as they pass along the line.

Work transfer device 12 is effective to transfer the workpieces by executing a closed rectilinear path of motion as indicated in FIG. 1A. In the illustrated embodiment of the invention the actual transfer is accomplished by means of a walking beam type transfer bar 32. Work holders 34 are mounted on beam 32 at locations corresponding to the spacing between the work stations 26. The two devices 14 and 16 impart the rectilinear motion to the walking beam and hence to the individual work holders.

FIG. 1 illustrates the walking beam in a position corresponding to the position identified by the letter a in FIG. 1A. This is the midpoint of the transverse vertical extension stroke identified by the arrow a'. As the work transfer device executes the transverse extension stroke, the walking beam is elevated. During the transverse extension stroke, the beam is in the longitudinally retracted position. As the beam elevates, the work holders 34 engage the corresponding workpieces 28 lifting them from the work stations 26. As the cycle reaches the point indicated by the letter b, the lifting motion ceases, and the beam is shifted longitudinally forward in the direction identified by the arrow b'. The horizontal stroke corresponds to the longitudinal spacing between work stations 26 so that when the point indicated by the letter c is reached, each workpiece 28 is directly over the next work station 26. Now the beam begins the transverse retraction stroke identified by the arrow c' depositing each workpiece 28 on the new work station 26 in the vicinity of midstroke indicated by the letter d. From there the beam continues to retract so as to clear the work stations and when the point designated bu the letter e is reached, the downward motion ceases. The beam is then longitudinally returned along the path indicated by the arrow d'. When the point indicated by the letter f is reached, the return stroke ceases, and the next vertical extension stroke begins. Thus it can be perceived that the walking beam executes a closed rectilinear motion path. It will be appreciated, however, that the path of travel may not be exactly rectangular; by way of illustration the rounded corners shown in FIG. 1A of the motion diagram indicate a certain amount of overlap between the vertical and horizontal motions when a transition occurs between them.

Once the workpieces have been advanced to their new stations there may occur a clamping or alignment of the workpieces at the work stations preparatory to the actual machining operations. In order to optimize efficiency in operation of the line, these operations on the workpiece are conducted as soon as the transfer bar has vertically retracted. Depending upon the cycle time of the machines, the work transfer device may or may not be continuously cycled.

The means by which the walking beam is caused to execute its rectilinear motion can be seen by consideration of the detailed construction of the master unit 14 as shown in FIGS. 2 through 8. Master unit 14 has a generally rectangular overall configuration comprising a base 36, end walls 38, 40, sidewalls 42, 44 and a top wall 46. A longitudinal slot 48 is provided in top wall 46 adjacent side wall 42. A beam support 50 extends through slot 48 from the inside of unit 14 to support beam 32. The illustrated construction for beam support 50 comprises a pair of vertical rods 52 having circular cross sections which pass through slot 48. A tie bar 54 is affixed to the upper ends of rods 52, a beam 32 is secured to the tie bar.

The internal construction of master unit 14 comprises a drive shaft 60 which is arranged horizontally longitudinally within the unit with the ends of the drive shaft being suitably journaled in end walls 38 and 40. The right hand end of drive shaft 60, as viewed in FIGS. 1 and 2, is coupled to a drive 62 which supplies the power to operate the work transfer device. The illustrated drive may be an electric drive operating through a suitable transmission and clutch coupling so that one full rotation of drive shaft 60 will produce a full motion cycle of the walking beam.

Affixed to a drive shaft 60 within the interior of the unit are a pair of barrel cams 64 and 66 respectively. Barrel cam 64 is located longitudinally at the central region of drive shaft 60 while barrel cam 66 is at the left hand end of the drive shaft as viewed in FIGS. 1 and 2. Barrel cam 64 controls the horizontal longitudinal motion of the walking beam while barrel cam 66 controls the vertical motion. They will be referred to as the horizontal and vertical cam respectively.

The horizontal cam comprises an endless ribbed cam 68 which is profiled to produce the desired longitudinal stroking of the walking beam in accordance with the rectilinear operating cycle. The vertical cam has a grooved cam 70 which is profiled to produce the desired vertical stroking of the walking beam in accordance with the closed rectilinear operating cycle.

The cylindrical rods 52 of beam support 50 are suitably journaled for vertical shifting on a carriage 72 in unit 14. The carriage in turn is itself shiftable in the horizontal longitudinal direction along a pair of circular cylindrical guide rods 74 which extend between the end walls 38 and 40. The guide rods 74 are located laterally within the unit between the barrel cams and the sidewall 42.

Horizontal motion for shifting carriage 72 longitudinally on guides 74 is imparted to the carriage from horizontal cam 64 by means of a lever arm 76, which is located above cam 64 just below top wall 46. Lever arm 76 is disposed generally horizontally and is pivotally mounted at one end about a vertical pivot axis 78. For this purpose the lever arm is pivoted on a suitable pivot joint 80 which is secured to the far side wall 44. (See FIG. 4). The far opposite end of lever arm 76 is operably coupled with carriage 72 by means of a roller and track connection. A circular roller 82 is mounted on the underside of the lever arm. A lateral track 84 is defined on the top of the carriage by a pair of longitudinally spaced parallel members 86 secured to the carriage. As can be seen in FIG. 4 the members 86 project laterally beyond the far side of the carriage toward the far side wall 44. Roller 82 is disposed on the underside of lever arm 76 and is free to rotate about a vertical axis 88, and fits closely within the track. If lever arm 76 is caused to swing about axis 78 in the direction of the arrow 87 in FIG. 4, there occurs a corresponding longitudinal shifting of the carriage along guides 74, roller 82 traveling within track 84 during the stroking. Because the beam support 50 moves longitudinally with the carriage, the walking beam also moves longitudinally.

Lever arm 76 is operated via a cam follower 90 operatively coupling cam 64 with the lever arm. Follower 90 is guided for horizontal longitudinal movement on a pair of parallel longitudinally extending guide rods 92. A lateral track 94 is provided on the top side of the follower by means of a pair of parallel horizontal members 96. A roller 98 on the under side of lever 76 fits closely within track 94 and is free to rotate about a vertical axis 100. As can be seen in FIG. 2, the underside of follower 90 includes a pair of circular rollers 102, 103. The rollers 102, 103 engage opposite sides of the ribbed cam 68.

As cam 64 rotates, rollers 102, 103 by virtue of their engagement with cam 68 cause follower 90 to be shifted longitudinally on guides 92. The motion imparted to follower 90 tracks the profile of cam 68. The horizontal longitudinal motion of follower 90 is imparted to lever 76 via the connection provided by roller 98 and track 94 to correspondingly pivot the lever arm about axis 78. The pivoted motion imparted to lever 76 via follower 90 in turn causes carriage 72 to be correspondingly longitudinally shifted along guide 74. It will be recognized that as follower 90 is longitudinally shifted, roller 98 rides within track 94, similar to roller 82 riding within track 84. The motion of the lever arm 76 is such that the forward longitudinal stroke of the walking beam is caused by the lever arm swinging from left to right as viewed in FIG. 4. FIG. 4 illustrates the carriage in the longitudinal return position. The arrangement is such that there is a multiplication of the throw of the horizontal cam whereby carriage 72 is shifted longitudinally a distance greater than the actual profile of the cam. Roller 100 may be mounted in a slot in lever arm 76 to provide a range of adjustment positions along the length of the lever arm within the slot. The adjustment of the roller within the slot serves to change the relative relationship between the follower 90 and the carriage 72 whereby the longitudinal stroke of the carriage is a function of the adjustment position of the roller within the lever arm slot. This adjustment feature is advantageous in that it allows the work transfer device to be adjusted to the specific transfer stroke requirements of a given installation. Cam 68 is shaped with a profile which will create the desired corresponding longitudinal shifting of carriage 72 in accordance with the motion diagram.

FIG. 6 shows further detail of cam follower 90 and related structure. The follower comprises a main body 91 which is longitudinally shiftable on the guide rods 92. The two members 96 forming the track 94 mount on the top of main body 91 and are fastened to it by means of screws. Roller 102 is secured to main body 91 at a fixed location. A shank 102a projects upwardly from the roller through a suitable hole in the main body 91, and a nut 102b is threaded onto the threaded shank to secure the roller in place. Roller 103 is adjustably mounted on body 91 by means of an adjustable block 103a which may be adjusted in such a manner as to provide an optimum fit of the ribbed cam 68 between the two rollers 102, 103. Once the adjustable block 103a has been located in the desired position, fastening screws are tightened to lock it in that position. While a ribbed barrel cam has been disclosed for the horizontal cam and a grooved barrel cam for the vertical cam, the use of a ribbed vs. a grooved cam will depend upon the requirements for a given installation. Typically, the rib cam is preferable where increased loads are encountered. However, basic principles of the invention are not limited by the particular type of cam utilized.

Vertical cam 66 is operably coupled with beam support 50 by the following structure. A bellcrank 104 is mounted on the unit for rocking motion about a laterally disposed horizontal axis 106. In the disclosed embodiment bellcrank 104 is pivotally mounted on an upright post 108 on base 36. The illustrated bellcrank 104 comprises a pair of angularly spaced crank arms 110, 112 respectively. A circular roller 116 is mounted at the distal end of crank arm 110 and can rotate about a horizontal axis 118. Roller 116 fits closely within cam groove 70. A circular roller 122 is provided at the distal end of crank arm 112 and can rotate about a horizontal axis 123. Roller 122 fits closely within a hole 124 which is provided in the vertical wall of a horizontal track bar 126.

Figure 8:
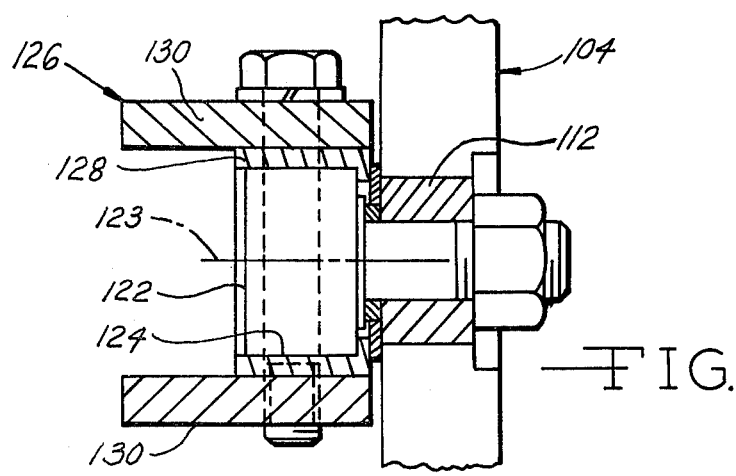
FIG. 8 is an enlarged fragmentary vertical sectional view taken in the direction of arrows 8—8 in FIG. 2.

As perhaps best seen in FIG. 8, track bar 126 is of a generally channel shaped configuration constructed from a main bar section 128 forming the vertical wall and from top and bottom sections 130. These three sections are bolted together and define a U-shaped track, the interior of which faces the reader when viewed in FIG. 2.

The mechanism further includes a second bellcrank 134 which is pivotally mounted via a ball bearing assembly 133 and pin 135 (FIG. 5) on a post 136 to pivot about an axis 137. The second bellcrank is located longitudinally of the first bellcrank and their respective pivot axes are parallel and at the same vertical elevation. The second bellcrank includes a crank arm 138 having a roller 140 at its distal and which engages a hole 142 in track bar 126. The second crank arm 144 of bellcrank 134 is generally parallel to crank arm 110 of the first bellcrank.

Crank arms 110, 144 of the two bellcranks are coupled together by means of a drag link 146. FIG. 5 illustrates detail of the coupling of the drag link to crank arm 144. As can be seen, a circular counterbored hole 150 is made in the crank arm and a roller assembly 152 is inserted through the hole so that the roller 154 fits within the counterbore. The threaded shank 156 of the roller assembly passes through a hole in the drag link and a nut 158 is fastened onto the threaded shank. In this way the connection provides for pivotal motion between the crank arm and the drag link about a horizontal transverse axis 160. There is a similar connection of the drag link to crank arm 110 about a horizontal transverse axis 162. As can be seen best in FIG. 2, this arrangement defines a parallelogram linkage wherein the parallelogram is defined by the pivot axes 106, 137, 160, and 162.

With this arrangement bellcrank 104 rocks about pivot axis 106 during selected portions of the rotation of vertical cam 66. Bellcrank 134 duplicates the rocking action of the bellcrank 104 and consequently, both crank arm 112, 138 experience a similar rocking. In other words, the generally horizontal rocking motion imparted to crank arm 110 by cam 66 is converted to a generally vertical rocking motion of crank arm 112. The inclusion of the drag link and the second bellcrank creates a generally vertical rocking motion of crank arm 138 in exact phasing with that of crank arm 112. Consequently, track bar 126 is displaced generally vertically in accordance with the rocking motion of the two bellcranks. Because the actual motions of crank arms 112, 138 are along arcs, there is some slight horizontal component of motion imparted to the track bar; however, as will become more apparent, the purpose of the mechanism is to impart vertical motion to the track bar for effecting corresponding vertical motion of the beam support 50.

It will be observed that the parallelogram linkage will ensure that track bar 126 is always maintained in a horizontal, longitudinal orientation, even when it is being displaced vertically.

The beam support 50 is coupled with track bar 126. For this purpose a horizontal bar 166 spans and is secured to the lower ends of the rods 52. A circular roller 170 is centrally located on bar 166 between the two guide rods, and fits in track bar 126. When carriage 72 is shifted longitudinally on the guides 74, circular roller 170 rides along track bar 126 due to parallelism of the track bar to the horizontal carriage travel. When cam 70 calls for vertical motion to be imparted to the beam support, track bar 126 is shifted vertically by the aforementioned bellcrank mechanism. In turn, the vertical motion of the track bar is coupled via roller 170 to impart a like vertical motion to the beam support 50. The overall length of the track bar is such that roller 170 is always contained within the track throughout the full range of longitudinal travel of the carriage. With this construction, vertical motion can be imparted to the beam support regardless of the horizontal position of the carriage. However, in the example of the disclosed embodiment, the closed rectilinear path of travel shown in FIG. 1A is preferred, and this means that vertical motions occur when the carriage is at the ends of its horizontal stroke.

It will also be observed that the track bar experiences only a limited horizontal component of displacement. Accordingly, it means that the overall length of the unit which is required to accommodate the horizontal transfer stroke does not have to be increased to accommodate the mechanism which creates the vertical stroke. A further advantage is that increased weight carrying capacity is obtained because vertical support is provided at two longitudinally spaced points, namely at rollers 122 and 140.

In view of the foregoing description, the overall operation of the work transfer device may be summarized as follows. The mechanical drawing FIGS. 1 through 8 show the work transfer mechanism at the point of its operating cycle corresponding to the point designated by the letter a in the motion diagram of FIG. 1A. At this point in the operating cycle the work transfer device is at the midpoint of its vertical extension stroke wherein the walking beam is being vertically elevated. Hence, the carriage 72 is in the full return position at the left hand end of the guides 74. The two bellcranks are at the midpoints of their respective rocking arcs with crank arms 112 and 138 being generally horizontal. Roller 116 is at the midpoint of the vertical cam profile and is directly vertically above pivot axis 106 of the first bellcrank 104.

As the vertical extension stroke is being completed in the direction of arrow a', the two bellcranks continue to pivot in the counterclockwise sense as viewed in FIG. 2 producing a corresponding upward motion of the walking beam to cause the work holders 34 to engage workpieces 28 and lift them from the work stations 26. At the conclusion of the vertical extension stroke, the bellcranks are at their full counterclockwise limits of pivoting, and track bar 126 is at its maximum vertical elevation above the base 36. Also at this point, the workpieces 28 are clear from their respective work stations so that the longitudinal forward transfer can now take place.

As the forward longitudinal transfer stroke (indicated by the arrow b' in FIG. 1A) begins, the track bar remains in the uppermost position. Horizontal cam 64 is now effective to longitudinally shift follower 90 along guides 92. Correspondingly, lever arm 76 pivots in the counterclockwise sense as viewed in FIG. 4 to advance carriage 72 to the right. As carriage 72 shifts longitudinally over the forward transfer stroke, roller 170 rides horizontally forwardly along track bar 126. It will be noted that the rollers 122 and 140 do not intrude into the interior of the track bar channel and hence, the roller 170 is free to ride in the track bar without any interference. When lever 76 has been swung to its counterclockwise limit of travel, as viewed in FIG. 4, both follower 90 and carriage 72 are at the full right hand limit of travel. This position is represented by the broken line position of the carriage in FIG. 2. At this point of the cycle, each workpiece 28 has been advanced to the next succeeding work station 26 on which it is to be located.

Carriage 72 remains in the fully advanced position while the vertical cam 66 now becomes effective to lower the walking beam as indicated by the arrow c' in FIG. 1A. This is the vertical transverse retraction stroke and is accomplished by the vertical cam profile causing bellcrank 104 to rock in the clockwise sense as viewed in FIG. 2. At this portion of the operating cycle it may be noted that roller 170 is at the far right hand end of track bar 126. Because the track bar is supported both at its midpoint and at its far right hand end, via the two bellcranks, the combined weight of the walking beam, the beam support and the workpiece is more uniformly supported on the work transfer device, promoting better performance and operation. As the mechanism executes the transverse retraction stroke in the direction of the arrow c' in FIG. 1A, the workpieces 28 are deposited at the work stations 26 after which the walking beam vertically clears the workpieces and work stations in anticipation of the longitudinal return stroke. At the conclusion of the vertical retraction stroke, the bellcranks have been pivoted to the clockwise limit and track bar 126 is at its lowermost position.

As the longitudinal return stroke begins, horizontal cam 64 is effective to pivot lever arm 76 in the clockwise sense as viewed in FIG. 4. This results in a corresponding longitudinal shifting of carriage 72. During the return stroke of the carriage, roller 170 rides in track bar 126. When the carriage has been shifted to the far left position as viewed in FIG. 2, the longitudinal return stroke is complete. Now vertical cam 66 is once again effective to elevate the walking beam via the parallelogram linkage and track bar. This concludes a complete operating cycle of the work transfer device.

The actual velocity of motion which is imparted to the walking beam in both horizontal and vertical directions is a function of the detailed construction of the mechanism and particularly of the profiles of the respective cams. The cams may be designed in accordance with conventional techniques to impart suitable velocities to the parts of the mechanism during transfer. It may be desirable to provide profiles which cause minimum accelerations and decelerations during engagement and release of workpieces by the walking beam. Such features can be incorporated using conventional design practices.

From the foregoing description it can be seen that a new and improved construction for a work transfer device has been disclosed. The construction of the preferred embodiment is particularly compact and well suited to promote efficiency in layout and operation of an automated line. The use of the lever arm multiplication for the horizontal transfer stroke is exemplary and it is contemplated that other mechanisms for effecting horizontal transfer may be employed in mechanisms embodying principles of the invention. Compactness is also promoted by arranging the two cam followers 90 and 116 so that they engage the horizontal and vertical cams respectively at locations which are angularly circumferentially spaced relative to the axis of drive shaft 60. In the disclosed embodiment, the two followers are at 90° circumferential spacing with respect to each other. With the vertical motion mechanism at one side of the vertical cam, an efficient arrangement of the internal components of the mechanism results. In addition to the efficient arrangement of the component parts of the mechanism, improved performance and operating capability are also obtained. Hence, the invention is well suited for promoting efficiencies in automation lines such as the example described herein.

In certain automated lines the overall length of the line may require more than one work transfer device. Heretofore, one way of accommodating long lengths of automated lines involves using several work transfer devices at spaced locations along the length of the line. Where the devices each contain horizontal and vertical cams, it becomes necessary to closely synchronize the cams of the respective work transfer devices so that the desired transfer of workpieces in unison results. This prior procedure presents a number of disadvantages. For one, use of identical work transfer devices involves duplication of a substantial number of component parts. What is meant by this for example, is that one set of cams contains the complete information relative to the vertical and horizontal motions of the beam, regardless of length. However, in order to actually operate the beam it becomes necessary to duplicate the cams at each work transfer device. Another problem is that close synchronization of the devices is difficult to achieve.

The present invention, in a further respect, provides the capability for use with long transfer lines but without requiring substantial duplication of parts. Thus, in the example of FIG. 1, a master unit 14 is associated with the line and where the length of the line is sufficiently long, one or more slave units 16 are operatively associated with the master unit 14. As can be observed in FIG. 1, the slave unit 16 has a considerably reduced lateral width from the master unit 14.

Details of the construction of slave unit 16 are shown in FIGS. 9 through 11. The most significant difference between the slave and master units is that the slave unit does not use the barrel cams 64, 66, the drive shaft 60 or an independent drive. Slave unit 16 does contain a carriage 72, longitudinal guides 74 on which carriage 72 is longitudinally shiftable, a beam support 50 comprising the vertical rods 52 which are shiftably mounted on carriage 72, and a parallelogram linkage and track bar for imparting vertical motion to the beam support. Longitudinal motion is imparted to carriage 72 in the slave unit by virtue of the walking beam itself. Hence, there is no need for any horizontal drive in the slave unit. Vertical motion is imparted by extending the drag link from the master unit to the slave unit, suitable aperatures being provided in the end walls through which the drag link passes. The slave unit comprises a pair of bellcranks 104', 134' corresponding to bellcranks 104, 134 of the master unit. As can be seen in FIG. 10 the bellcranks 104', 134' are pivoted on the far sidewall of the unit.

The motion imparted to the drag link by the master unit is coupled to the slave unit. The arrangement of the component parts of the slave unit is the same geometrically as that of the master unit. Hence, the beam support of the slave unit duplicates exactly, the horizontal and vertical motions imparted to the master unit by the horizontal and vertical cams. It may also be noted that the longitudinal slots in the top walls of the two units, through which the rods 52 pass, are covered by a sliding cover which slides lengthwise with the forward and return horizontal transfer strokes of the device.

In the foregoing detailed description, a new and improved work transfer device has been disclosed. While the present application discloses the invention in use in association with an automated machining line, the invention may be used in association with other types of automated lines such as automated assembly machine lines, automated gauging machine lines, and automated testing machine lines. While the disclosure is of a preferred embodiment, it will be appreciated that principles of the invention, as set forth in the following claims, are applicable to other embodiments.

We claim:

1. In a work transfer device for progressively transferring articles to successive stations having a base on which a carriage is longitudinally shiftable, work engaging means movable longitudinally with the carriage while being shiftably mounted on the carriage for transverse shiftable movement with respect to the carriage, drive means for shifting the carriage longitudinally of the base and for shifting the work engaging means transversely of the carriage so as to cause the work engaging means to execute a generally rectilinear path of movement for progressively transferring articles between successive stations, the improvement for imparting transverse motion to the work engaging means wherein there is provided a track parallel to the longitudinal travel of the carriage and wherein a track engaging means is coupled with the work engaging means so that the two move longitudinally in unison, said track engaging means riding within the track, and means operably mounting the track on the base for bodily transversely displacing the track while maintaining the track parallel with the longitudinal travel of the carriage thereby to impart transverse motion to the work engaging means.

2. A work transfer device as set forth in claim 1 wherein the track is operably supported on the base at two longitudinally spaced locations.

3. A work transfer device as claimed in claim 2 wherein the track is supported on the base at the two longitudinally spaced locations by a pair of longitudinally spaced bellcranks.

4. A work transfer device as set forth in claim 3 wherein the two bellcranks operate in unison to effect transverse bodily displacement of the track.

5. A work transfer device as set forth in claim 4 wherein the two bellcranks have corresponding crank arms connected together by means of a drag link so to operate in unison.

6. A work transfer device as set forth in claim 5 wherein the drag link is parallel to the track.

7. A work transfer device as set forth in claim 4 wherein one bellcrank is pivotally mounted on the base about a pivot axis located near one end of the track and the other bellcrank is pivoted on the base about a pivot axis located near the middle of the track.

8. A work transfer device as set forth in claim 7 wherein the two longitudinally spaced locations at which the track is supported are asymmetrically located with respect to the length of the track.

9. A work transfer device as set forth in claim 1 wherein a four bar parallelogram linkage imparts transverse bodily displacement to the track with two of the four joints of the linkage defining a fixed link which is parallel to the track.

10. A work transfer device as set forth in claim 9 wherein a crank arm projects from each of said two joints of the linkage to provide coupling to two longitudinally spaced locations on the track.

11. A work transfer device as set forth in claim 1 wherein the track engaging means comprises a roller engaging the track and riding in the track during longitudinal shifting of the carriage, the roller being transversely captured by the track.

12. A work transfer device as set forth in claim 1 wherein the track, when being transversely bodily displaced also experiences a small longitudinal component of displacement.

13. A work transfer device as set forth in claim 1 wherein the longitudinal motion is in a horizontal direction and the transverse motion is in a vertical direction.

14. A work transfer device as set forth in claim 13 wherein the improvement for imparting transverse motion to the work engaging means includes a bellcrank pivotally mounted on the base for pivotal motion about a horizontal transverse axis and a second bellcrank pivotally mounted on the base for pivotal motion about a horizontal transverse axis which is spaced longitudinally from the horizontal transverse axis of the first bellcrank and wherein the track is connected to corresponding arms of the two bellcranks.

15. A work transfer device as set forth in claim 14 wherein the pivot axis of one of the bellcranks is located near one longitudinal end of the track and the pivot axis of the other bellcrank is located near the middle of the length of the track.

16. A work transfer device as set forth in claim 14 wherein the drive means includes a drive shaft disposed with its axis parallel to the horizontal longitudinal direction, a cam affixed to the drive shaft for rotation with the drive shaft and wherein one of said bellcranks includes a follower on one of its crank arms engaging the cam to follow the cam profile and thereby impart pivotal motion to the first bellcrank, the second bellcrank being operably coupled with the first bellcrank to pivot in unison therewith.

17. A work transfer device as set forth in claim 16 wherein the bellcranks are disposed to one lateral side of the drive shaft and the cam follower engages the cam at the same vertical elevation as that of the axis of the drive shaft.

18. A work transfer device as set forth in claim 17 wherein the pivot axes for the bellcranks are disposed vertically at a level below the vertical elevation of the drive shaft axis and the carriage is disposed vertically directly above the track.

19. A work transfer device as set forth in claim 18 including a second cam mounted on the drive shaft for rotation therewith and means to drive the carriage horizontally from the second cam, said means to drive the carriage including a follower engaging the second cam at a location which is circumferentially spaced about the axis of the drive shaft 90° from the location at which the follower on the first bellcrank engages the first cam.

20. In a work transfer device having a base on which work engaging means repeatedly executes an operating cycle of motion in a closed generally rectilinear path to progressively advance workpieces from station to station and having longitudinal guide means, means longitudinally shiftable on the longitudinal guide means for correspondingly longitudinally shifting the work engaging means, means mounted on said longitudinally shiftable means for transverse shiftable movement relative thereto for correspondingly transversely shifting the work engaging means, means for imparting longitudinal motion to the longitudinally shiftable means in properly phased relation to the operating cycle and means for imparting transverse motion to the transversely shiftable means in properly phased relation to the operating cycle, said means for imparting transverse motion comprising a bellcrank having a pivot axis pivoted on the base and including first and second crank arms, drive means, means connecting the first crank arm to said drive means for rocking the bellcrank about its pivot axis in phased relation to the operating cycle and means connecting the other crank arm to the transversely shiftable means so that the rocking action of the bellcrank is converted to transverse motion of the transversely shiftable means, the improvement in the means for imparting transverse motion means to the transversely shiftable means which comprises a second bellcrank synchronously operated with the first bellcrank but imparting motion to the transversely shiftable means at a location spaced longitudinally of the location at which the second crank arm of the first bellcrank is connected to the transversely shiftable means.

21. A work transfer device as set forth in claim 20 including a longitudinal track between the second crank arm of each bellcrank and the transversely shiftable means, the track being bodily shiftable in response to rocking action of the bellcranks to impart transverse motion to the transversely shiftable means, and track engaging means on the transversely shiftable means which rides in the track during longitudinal shifting of the longitudinal shiftable means and via which the transverse motion of the track is imparted to the transversely shiftable means.

22. A work transfer device as set forth in claim 20 including operatively associated therewith a slave unit having a pair of bellcranks whose geometry duplicates that of the first pair of bellcranks, a longitudinally shiftable carriage in the slave unit, transversely shiftable means on the carriage of the slave unit, work engaging means on the transversely shiftable means of the slave unit, and means for driving the bellcranks of the slave unit and the carriage of the slave unit from the work transfer device.

23. The combination set forth in claim 22 including a longitudinal drag link for coupling the rocking motion of the first pair of bellcranks to the pair of bellcranks of the slave unit.

* * * * *